US012365390B2

(12) United States Patent
Acosta Flores et al.

(10) Patent No.: US 12,365,390 B2
(45) Date of Patent: Jul. 22, 2025

(54) STRUCTURAL ASSEMBLY FOR VEHICLE

(71) Applicant: Ford Global Technologies, LLC, Dearborn, MI (US)

(72) Inventors: Alejandro Eli Acosta Flores, Toluca (MX); Diego Eduardo Mendoza Hernández, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 327 days.

(21) Appl. No.: 17/975,069

(22) Filed: Oct. 27, 2022

(65) Prior Publication Data

US 2024/0140530 A1 May 2, 2024

(51) Int. Cl.
*B62D 21/11* (2006.01)
*B62D 21/15* (2006.01)

(52) U.S. Cl.
CPC ............ *B62D 21/11* (2013.01); *B62D 21/155* (2013.01)

(58) Field of Classification Search
CPC ...... B62D 21/11; B62D 21/15; B62D 21/155; B62D 21/157; B62D 21/152; B62D 25/082; B62D 25/088; B60K 1/04; B60K 2001/0405; B60K 2001/0411
USPC .................. 296/187.12, 204, 203.02, 187.09
See application file for complete search history.

(56) References Cited

U.S. PATENT DOCUMENTS

| | | | | |
|---|---|---|---|---|
| 9,539,968 | B2 * | 1/2017 | Nishida | B62D 25/082 |
| 11,230,322 | B2 * | 1/2022 | Yoshida | B62D 21/152 |
| 2012/0248820 | A1 * | 10/2012 | Yasui | B62D 21/152 |
| | | | | 296/193.09 |
| 2020/0047696 | A1 * | 2/2020 | Atsumi | B62D 25/084 |
| 2020/0406971 | A1 | 12/2020 | Kamiya | |
| 2020/0406975 | A1 | 12/2020 | Nagaya et al. | |
| 2023/0021039 | A1 * | 1/2023 | Park | B62D 21/11 |
| 2023/0264557 | A1 * | 8/2023 | Yoshida | B62D 21/02 |
| | | | | 180/68.5 |
| 2024/0109592 | A1 * | 4/2024 | Nagasawa | B62D 21/03 |

* cited by examiner

*Primary Examiner* — Amy R Weisberg
*Assistant Examiner* — Denise Lynne Esquivel
(74) *Attorney, Agent, or Firm* — Burris Law, PLLC

(57) ABSTRACT

A structural assembly for an electric vehicle that includes a vehicle frame, a pair of suspension mounts and a deflector beam. The vehicle frame has a pair of longitudinal rails. The pair of suspension mounts are configured to support a vehicle suspension system. Each suspension mount is secured to a respective longitudinal rail of the pair of longitudinal rails. The deflector beam includes a body portion and opposing end portions. The body portion extends in a transverse direction relative to a longitudinal direction of the electric vehicle and is configured to support an electrical module between the pair of longitudinal rails. The deflector beam is secured to the pair of suspension mounts or the vehicle frame. Each end portion extends from the body portion to a respective location that is outboard of a respective suspension mount of the pair of suspension mounts.

20 Claims, 7 Drawing Sheets

STRUCTURAL ASSEMBLY FOR VEHICLE

FIELD

The present disclosure relates to a structural assembly for a vehicle and a vehicle having a structural assembly.

BACKGROUND

The statements in this section merely provide background information related to the present disclosure and may not constitute prior art.

Electric vehicles differ from conventional motor vehicles because they are driven by one or more rechargeable battery packs having lithium-ion batteries, for example, or any other suitable electrical power storage units. In some electric vehicles, attachment structures such as cross beams and/or plates are separate from the vehicle frame and used to support one or more electric modules (e.g., electrical charger) of the electric vehicle. In one example, the attachment structures may be attached to the left and right longitudinal rails of the vehicle frame and may support an electrical charger that charges the power storage units of the battery pack. Integration of the attachment structures into the structure of existing vehicles and providing efficient load paths in a variety of operating conditions can be challenging.

The teachings of the present disclosure address these and other issues with attachment structures of electric vehicles.

SUMMARY

This section provides a general summary of the disclosure and is not a comprehensive disclosure of its full scope or all of its features.

In one form, the present disclosure provides a structural assembly for an electric vehicle that includes a vehicle frame, a pair of suspension mounts and a deflector beam. The vehicle frame has a pair of longitudinal rails. The pair of suspension mounts are configured to support a vehicle suspension system. Each suspension mount is secured to a respective longitudinal rail of the pair of longitudinal rails. The deflector beam includes a body portion and opposing end portions. The body portion extends in a transverse direction relative to a longitudinal direction of the electric vehicle and is configured to support an electrical module between the pair of longitudinal rails. The deflector beam is secured to the pair of suspension mounts or the vehicle frame. Each end portion extends from the body portion to a respective location that is outboard of a respective suspension mount of the pair of suspension mounts.

In variations of the structural assembly of the above paragraph, which can be implemented individually or in any combination: the deflector beam is a tubular member; the deflector beam is located above the longitudinal rails; the end portions are angled in a forward direction of the electric vehicle; the structural assembly further includes a pair of gussets, one gusset of the pair of gussets is secured the body portion to one suspension mount of the pair of suspension mounts and the other gusset of the pair of gussets is secured to the body portion to the other suspension mount of the pair of suspension mounts; the body portion of the deflector beam includes a first end secured to the one suspension mount and a second end secured to the other suspension mount, and wherein the first end is located outboard relative to the one gusset and the second end is located outboard relative to the other gusset; the body portion of the deflector beam includes a first end secured to the one suspension mount via a first flange and a second end secured to the other suspension mount via a second flange; the structural assembly includes a support brace extending in the transverse direction relative to the longitudinal direction of the electric vehicle and configured to support the electric module, the support brace is spaced apart from the deflector beam; the support brace is secured to the pair of suspension mounts; the support brace is located further toward a rear of the vehicle frame relative to the deflector beam; the end portions are angled away from the suspension mounts; the deflector beam has a square shaped cross-section; and the end portions extend at an obtuse angle relative to the body portion.

In another form, the present disclosure provides a structural assembly for an electric vehicle that includes a vehicle frame, a pair of suspension mounts and a deflector beam. The vehicle frame has a pair of longitudinal rails. The pair of suspension mounts are configured to support a vehicle suspension system. Each suspension mount of the pair of suspension mounts being secured to a respective longitudinal rail of the pair of longitudinal rails. The deflector beam extends in a transverse direction relative to a longitudinal direction of the electric vehicle and is configured to support an electrical module. The deflector beam is secured to the pair of suspension mounts and includes a body portion and opposing end portions. The body portion extends between the pair of longitudinal rails. Each end portion of the opposing end portions extends from the body portion, outboard of the longitudinal rails at an angle that is away from the pair of suspension mounts.

In yet another form, the present disclosure provides an electric vehicle that includes a vehicle frame, a pair of suspension mounts, a support brace and a tubular shaped deflector beam. The vehicle frame has a pair of longitudinal rails. The pair of suspension mounts are configured to support a vehicle suspension system. Each suspension mount of the pair of suspension mounts being secured to a respective longitudinal rail of the pair of longitudinal rails. The support brace extends in a transverse direction relative to a longitudinal direction of the electric vehicle and is configured to support an electric module. The tubular shaped deflector beam extends in the transverse direction and is configured to support the electrical module. The deflector beam is secured to the suspension mounts and is spaced apart from the support brace. The deflector beam includes a body portion and opposing end portions. The body portion extends between the pair of longitudinal rails. Each end portion of the opposing end portions extends further in a lateral direction than a respective suspension mount of the suspension mounts. The end portions are angled in a forward direction relative to a horizontal axis extending in the transverse direction of the electric vehicle. The end portions are configured to deform in a rearward direction relative to the body portion during a front impact event.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
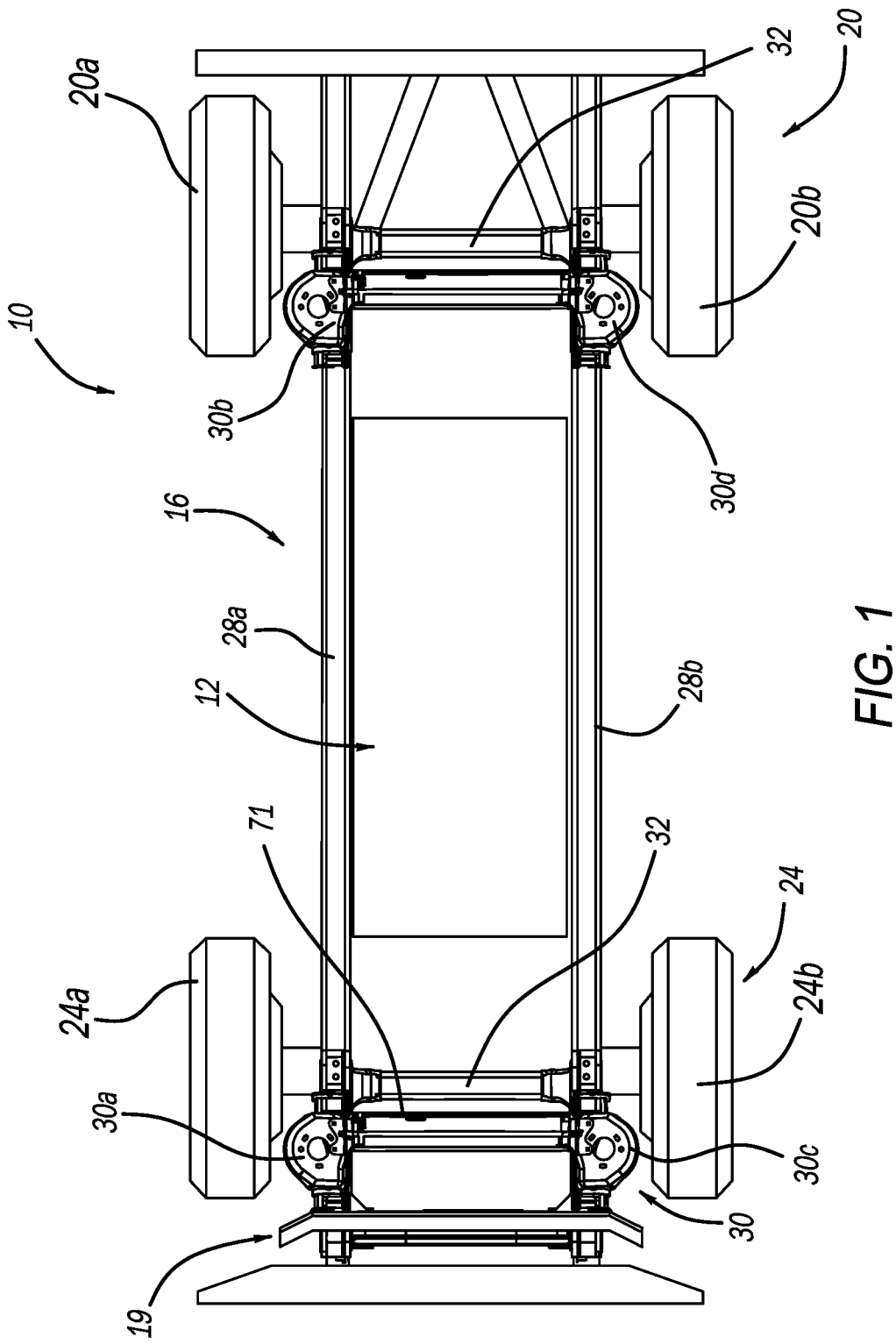
FIG. 1 is a schematic top view of a vehicle including a vehicle frame and a deflector beam according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 10 such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle. In still other examples, the vehicle 10 may be an internal combustion engine driven vehicle. In the example provided, the vehicle 10 is a body-on-frame type of vehicle, though other types of vehicle architecture can be used, such as uni-body for example.

Figure 2:
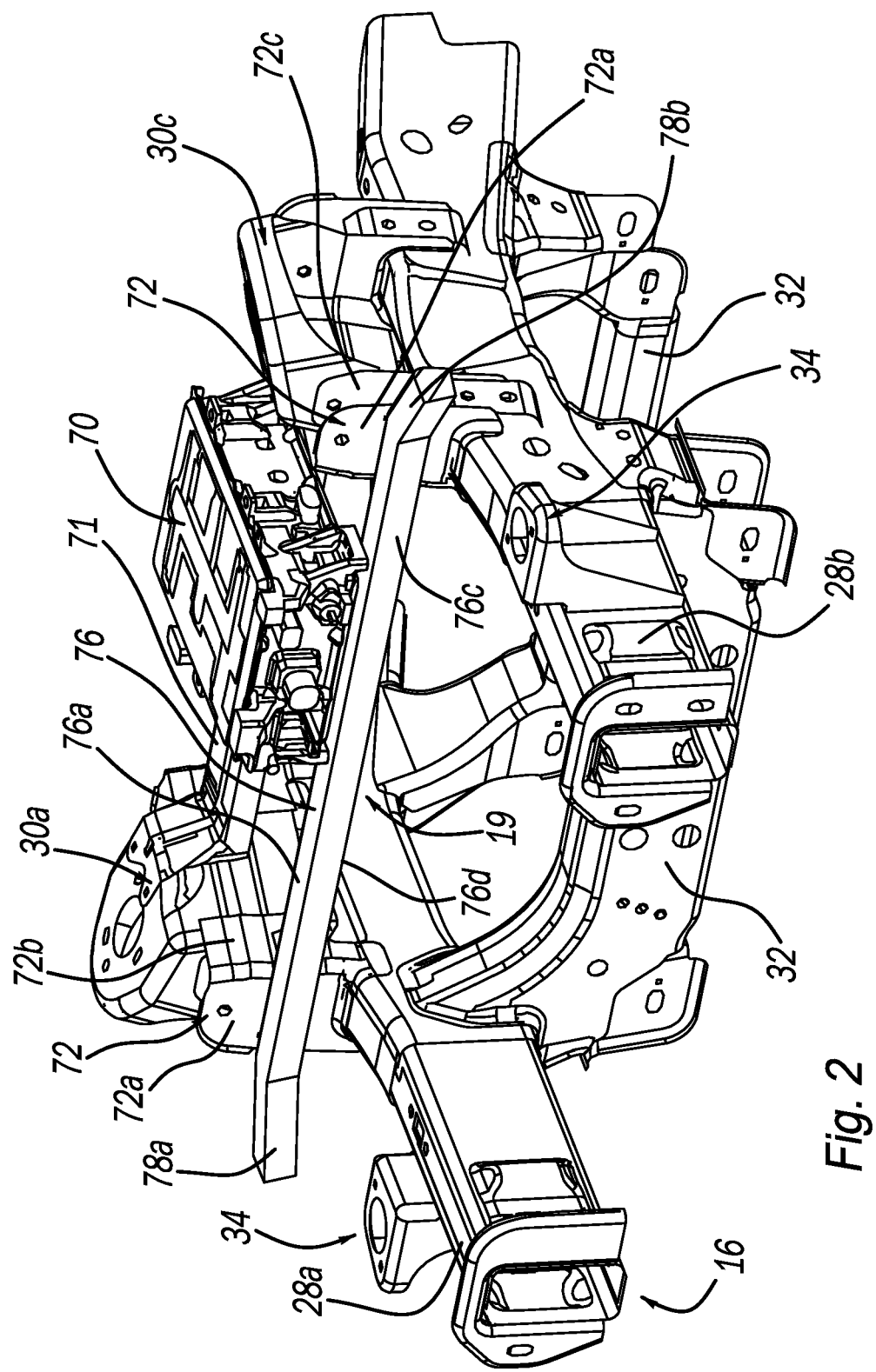
FIG. 2 is a perspective view of a portion of the vehicle of FIG. 1 including the deflector beam and the vehicle frame.
Figure 3:
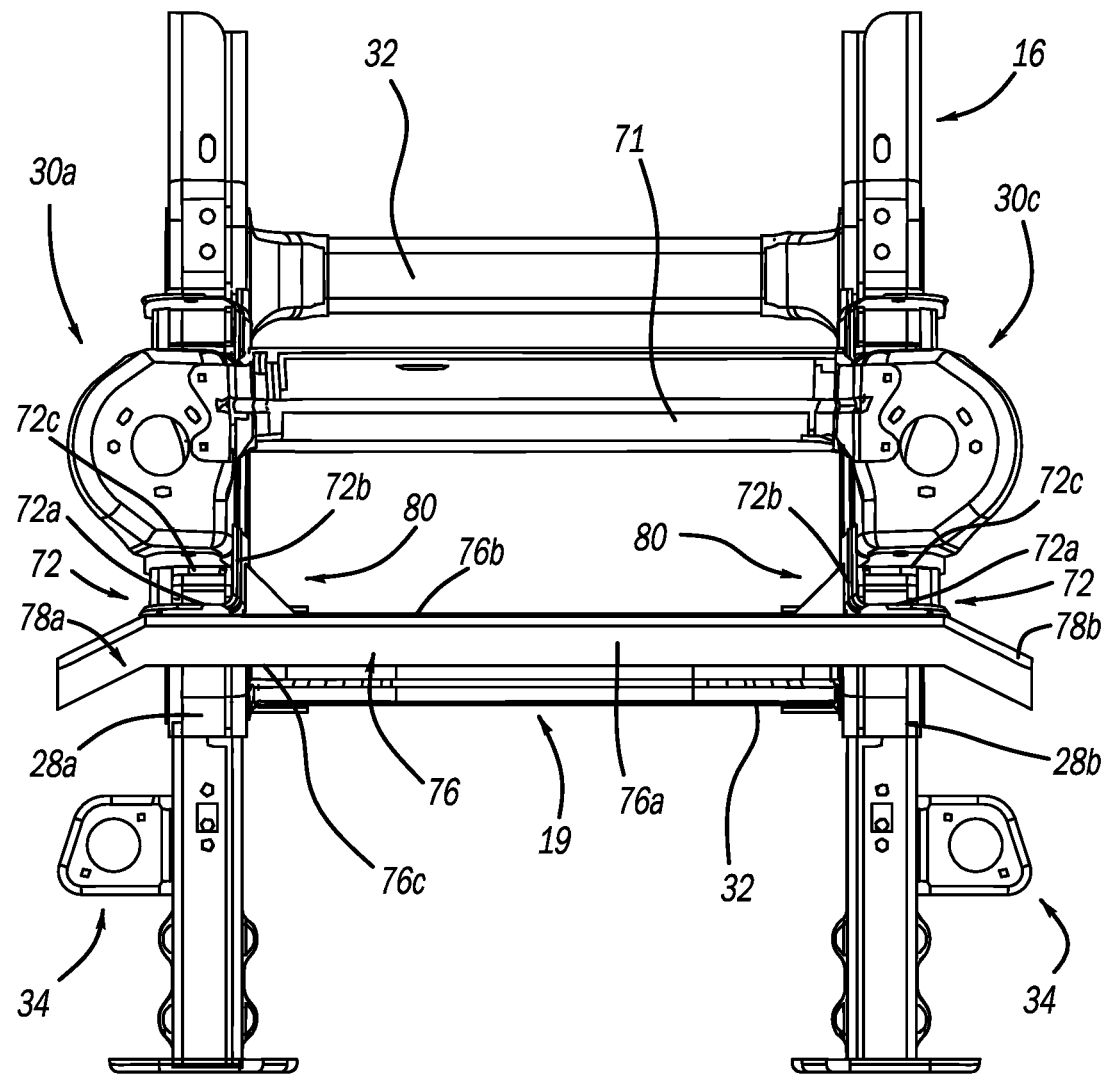
FIG. 3 is a top view of a portion of the vehicle of FIG. 1 including the deflector beam and the vehicle frame.
Figure 4:
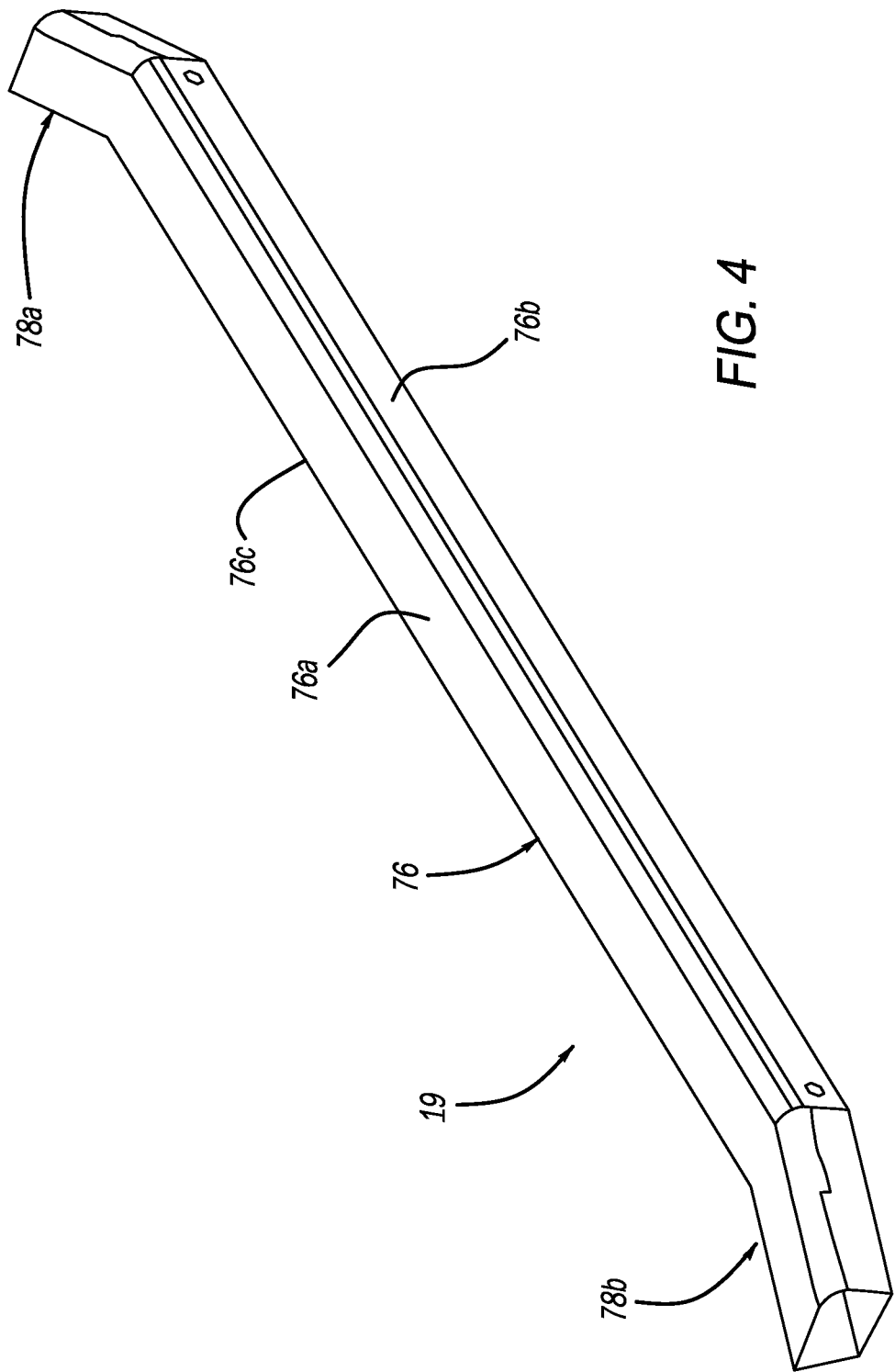
FIG. 4 is a perspective view of the deflector beam of FIG. 1.
Figure 5:
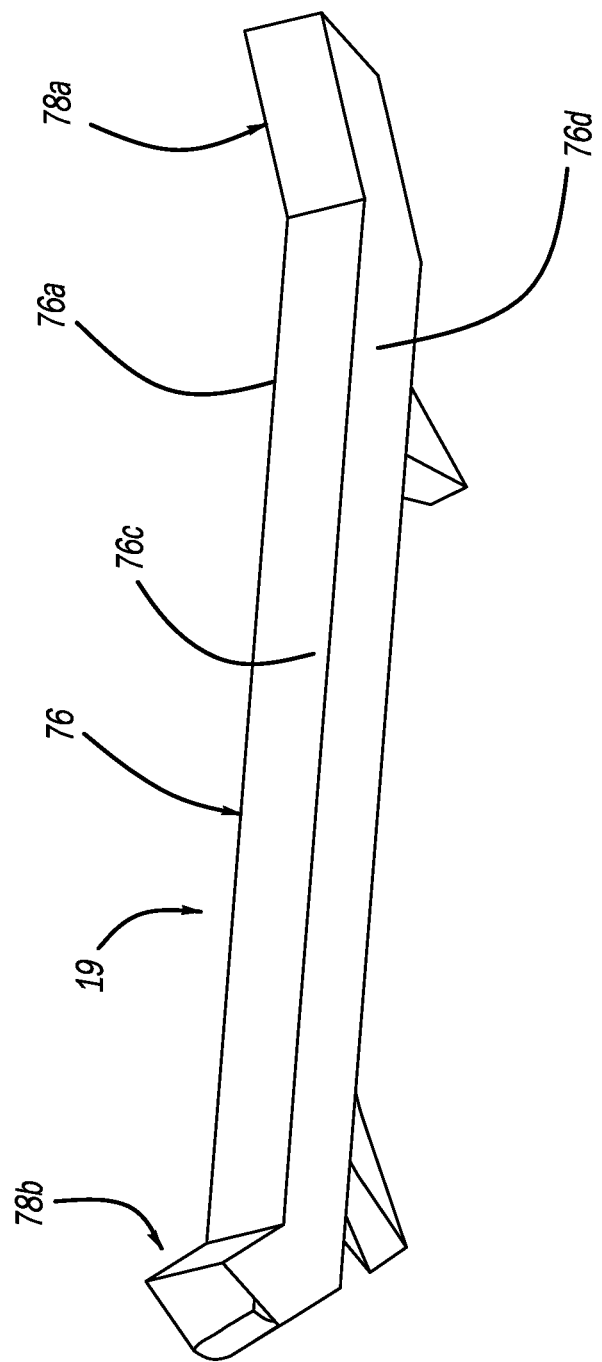
FIG. 5 is a bottom perspective view of the deflector beam of FIG. 1.

With additional reference to FIGS. 2 and 3, the vehicle 10 includes a battery structure 12 (FIG. 1), a vehicle body (not shown), a vehicle frame 16, and a deflector brace or beam 19. The battery structure 12 may be rechargeable and may include lithium-ion batteries, solid-state batteries, or any other suitable electrical power storage units. The battery structure 12 may be disposed at various locations of the vehicle 10 and may be secured to the vehicle frame 16 by a plurality of attachment methods such as a cover panel (not shown) covering the bottom of the battery structure and attaching the battery structure 12 to the vehicle frame 16. In this way, the battery structure 12 is supported by the vehicle frame 16 and is remote from a passenger cabin and cargo compartments (not shown) of the vehicle 10, therefore, not occupying space that would otherwise be available for passengers or cargo. The battery structure 12 includes an outer support frame (not specifically shown). The battery structure 12 powers one or more motors to drive a set of drive wheels. For example, the battery structure 12 may power a rear motor (not shown) to drive rear wheels 20a, 20b of a set of rear wheels 20 via a rear axle and/or may power a front motor (not shown) to drive front wheels 24a, 24b of a set of front wheels 24 via a front axle.

The vehicle body (not shown) is separate (distinct) from and mounted on the vehicle frame 16. Stated differently, the vehicle body is mounted on a plurality of body isolators 34 (FIGS. 2 and 3) secured to the vehicle frame 16.

The vehicle frame 16 is made of a metal material such as steel, for example, and may be manufactured by a roll forming process, for example. The vehicle frame 16 is the main supporting structure of the vehicle 10, to which various components are attached either directly or indirectly. For example, a suspension system 30 is secured to the vehicle frame 16, and secures the wheels 20, 24 (FIG. 1) of the vehicle 10 to the vehicle frame 16. The suspension system 30 provides a smooth ride by absorbing energy from various road bumps while driving, and assists the wheels 20, 24 to remain in contact with the road. In the example illustrated, the suspension system 30 includes a plurality of suspension mounts 30a, 30b, 30c, 30d that are configured to secure one or more components of the suspension system 30 to the vehicle frame 16. Mount 30a is secured to a front end of a longitudinal rail 28a of the vehicle frame 16 that is proximate a front end of the vehicle 10 and mount 30b is secured to a rear end of the longitudinal rail 28a (FIG. 1) of the vehicle frame 16 that is proximate a rear end of the vehicle 10. Similarly, mount 30c is secured to a front end of a longitudinal rail 28b of the vehicle frame 16 that is proximate a front end of the vehicle 10 and mount 30d is secured to a rear end of the longitudinal rail 28b (FIG. 1) of the vehicle frame 16 that is proximate a rear end of the vehicle 10. The suspension system 30 further includes various components such as upper and lower control arms, springs, shock absorbers, struts, and ball joints, for example.

The vehicle frame 16 includes the opposed longitudinal rails 28a, 28b and cross members 32. The rails 28a, 28b are spaced apart from each other and may establish a length of the vehicle frame 16. The rails 28a, 28b may also spaced apart from the outer support frame (not shown) of the battery structure 12. In this way, components such as electrical conduits (not shown), for example, may extend along and between the outer support frame (not shown) of the battery structure 12 and the rails 28a, 28b. The cross members 32 are structural members that extend in a transverse direction relative to a longitudinal direction of the vehicle 10 and connect the rails 28a, 28b to each other.

One or more components of the suspension system 30 may be secured to the rails 28a, 28b and/or the cross members 32. In the example illustrated, the vehicle frame 16 accommodates the battery structure at a center portion or mid-section thereof. As used herein, the center portion or mid-section of the vehicle frame 16 means the region of the vehicle frame 16 that is between the pair of suspension mounts 30a, 30c proximate the front of the vehicle 10 and the pair of suspension mounts 30b, 30d proximate the rear of the vehicle 10. The battery structure 12 is secured to the vehicle frame 16 at the center portion. The plurality of body isolators 34 are secured to and along a respective rail 28a, 28b of the vehicle frame 16.

With reference to FIGS. 2-5, the deflector beam 19 extends in a transverse direction relative to a longitudinal direction of the vehicle 10 and is configured to support one or more electrical modules 70 (FIG. 2) of the vehicle 10. In one example, the electrical module 70 may be an electrical charger that charges a power storage unit (e.g., battery cells (not shown)) of the battery structure 12. In another example, the electrical module 70 may be an onboard generator. A support brace 71 may extend in a transverse direction relative to the longitudinal direction of the vehicle 10 and may support the electrical module 70. The support brace 71 is spaced apart from the deflector beam 19 and is secured to an inner portion of the suspension mounts 30a, 30c. Stated differently, the support brace 71 does not extend laterally outwardly past the suspension mounts 30a, 30c. In the example illustrated, the support brace 71 has a flat portion supporting the electrical module 70 and is located further toward the rear of the vehicle frame 16 relative to the deflector beam 19. Stated differently, the support brace 71 is secured to a rear region of the suspension mounts 30a, 30c. In the example provided, the flat portion of the support brace 71 is along the top surface of the support brace 71, though other configurations can be used. In some forms, the support brace 71 may have a tubular shape.

The deflector beam 19 extends further in a lateral direction than the suspension mounts 30a, 30c. Stated differently, the deflector beam 19 extends outboard past the suspension mounts 30a, 30c in a lateral direction. In the example illustrated, the deflector beam 19 is a tubular member and is secured to flanges 72, which are, in turn, secured to the suspension mounts 30a, 30c. In some forms, the deflector beam 19 is secured directly to the suspension mounts 30a, 30c. In other forms, the deflector beam 19 is secured to the longitudinal rails 28a, 28b of the vehicle frame 16. The deflector beam 19 is located above the longitudinal rails 28a, 28b and the cross members 32 of the vehicle frame 16. In the example illustrated, the deflector beam 19 has a square or rectangular shaped cross-section. In some forms, the deflector beam 19 may have a circular shaped cross-section. In some forms, the deflector beam 19 may have uniform thickness. In other forms, the deflector beam 19 may have a variable thickness.

The deflector beam 19 includes a body portion 76 and opposing end portions 78a, 78b. The body portion 76 extends in a transverse direction relative to a longitudinal direction of the vehicle 10. In the example provided, the deflector beam 19 includes a flat upper wall 76a, a flat rear wall 76b, a flat front wall 76c (i.e., the front wall 76c is located further toward a front of the vehicle 10 relative to the rear wall 76b), and a flat bottom wall 76d that cooperate to form a square shape. The body portion 76 is configured to support an electrical module 70 of the vehicle 10 on the upper wall 76a thereof and the body portion 76 is attached to the suspension mounts 30a, 30c. That is, the rear wall 76b of the body portion 76 is attached to a first outboard portion 72a of the flanges 72 of the suspension mounts 30a, 30c. In one example, the rear wall 76b of the body portion 76 is welded to the first outboard portion 72a of the flanges 72. In another example, the rear wall 76b of the body portion 76 is attached to the flanges 72 by mechanical fasteners (not shown).

The first outboard portion 72a of each flange 72 is located further in a forward direction of the vehicle 10 and extends parallel to a second outboard portion 72c of the flanges 72. The second outboard portion 72c is attached to a respective mount 30a, 30c.

In the example illustrated, a plurality of gussets 80 further attach the body portion 76 to the suspension mounts 30a, 30c. The gussets 80 are attached to the suspension mounts 30a, 30c at a location that is between where the body portion 76 is attached to the first outboard portions 72a of the flanges 72. That is, one gusset 80, proximate the end portion 78a, secures the rear flat wall 76b of the body portion 76 to an inboard portion 72b of the flange 72 connected to the suspension mount 30a (i.e., the inboard portion 72b is inboard relative to the first and second outboard portions 72a, 72c and extends perpendicular to the first and second outboard portions 72a, 72c). Similarly, a different gusset 80, proximate the end portion 78b, secures the rear flat wall 76b of the body portion 76 to an inboard portion 72b of the flange 72 connected to the suspension mount 30c. In some forms, the gussets 80 may attach the body portion 76 directly to the mounts 30a, 30c. In the example illustrated, the gussets 80 have a triangular shape. In another example, the gussets 80 may have a different shape such as a square or rectangular shape.

As best shown in FIG. 3, end portion 78a extends past the suspension mount 30a in a first lateral direction Y1 and end portion 78b extends past the suspension mount 30c in a second lateral direction Y2 that is opposite the first lateral direction Y1. Each end portion 78a, 78b is angled in a forward direction. That is, each end portion 78a, 78b extends forward at an obtuse angle relative to the body portion 76 of the deflector beam 19. Stated differently, each end portion 78a, 78b is angled away from the suspension mounts 30a, 30c. In the example illustrated, the body portion 76 and the end portions 78a, 78b have a material thickness (i.e. gauge thickness) that is uniform. In some forms, the end portions 78a, 78b may have a material thickness that is less than a material thickness of the body portion 76. In this way, the deflector beam 19 has a variable thickness.

Figure 6A:
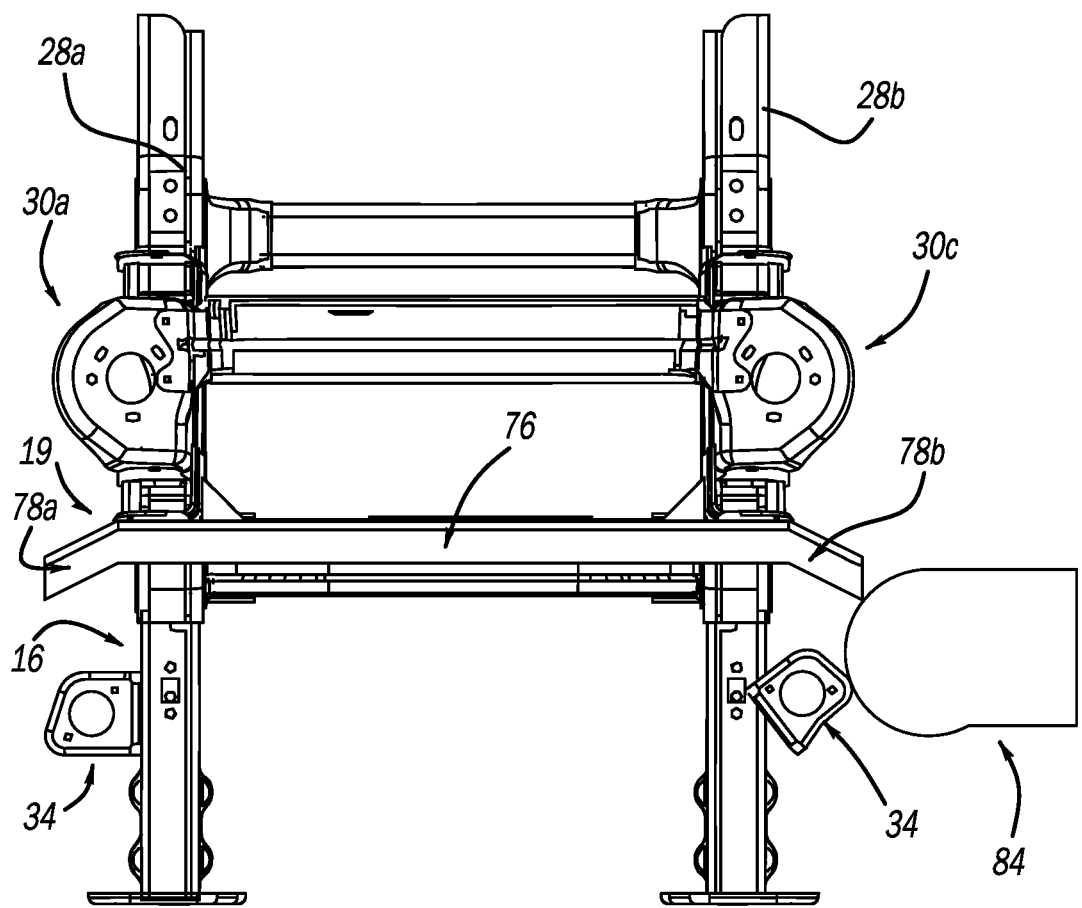
FIGS. 6A and 6B are top views of the deflector beam of FIG. 1 during different stages of an example impact event.
Figure 6B:
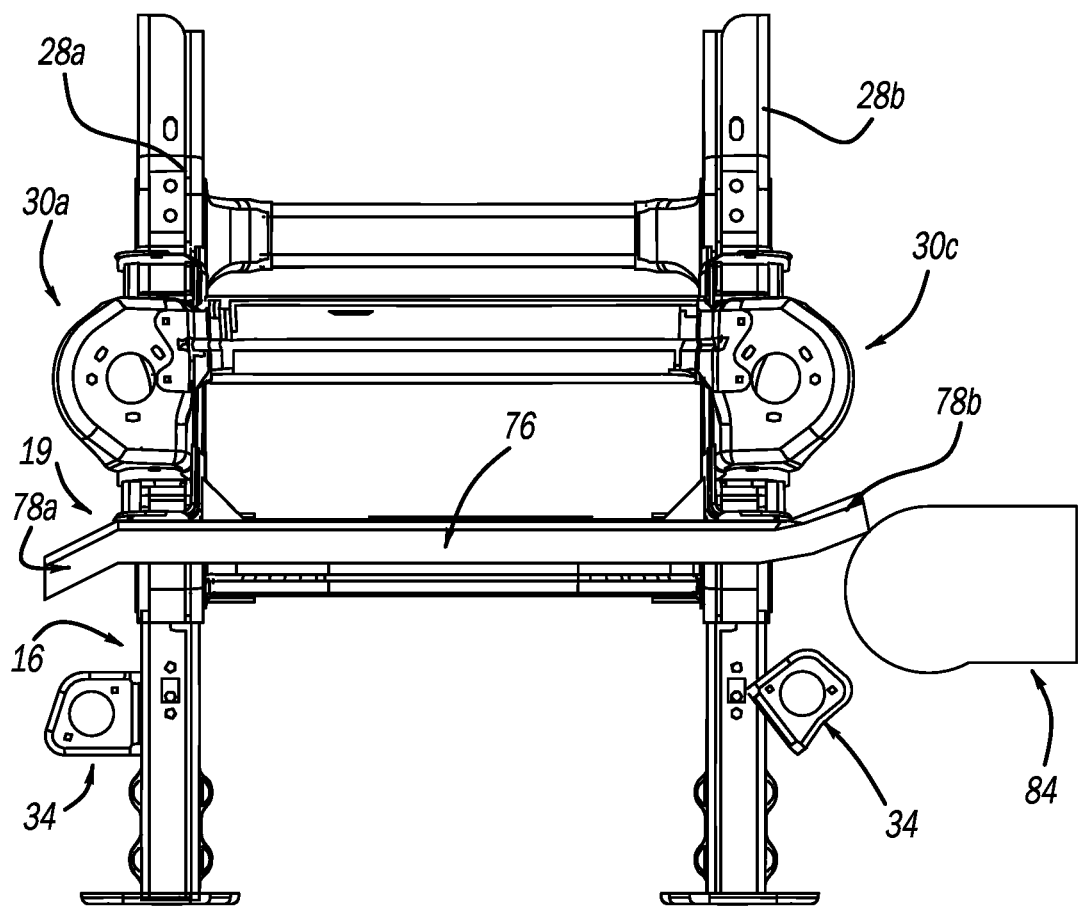

As shown in FIGS. 6A and 6B, during a vehicle impact event, for example, an object or barrier 84 located at a front of the vehicle 10 may engage the end portion 78b, which causes the end portion 78b to deform in a rearward direction relative to the body portion 76 of the deflector beam 19. This, in turn, causes the vehicle frame 16 to be displaced in the first lateral direction Y1, which inhibits the barrier 84 from engaging the suspension mount 30c. It should be understood that the end portion 78a of the deflector beam 19 may deform in a rearward direction in a similar manner as end portion 78b described above during a front vehicle impact event of the vehicle 10, thereby causing the vehicle frame 16 to be displaced in the lateral direction Y2.

The structural assembly of the present disclosure includes the vehicle frame 16, the suspension mounts, 30a, 30b, 30c, 30d and the deflector beam 19. The deflector beam 19 including end portions 78a, 78b extending at an obtuse angle away from the body portion 76 allows the end portions 78a, 78b to engage the barrier 84 during a vehicle impact event in a way that causes the vehicle frame 16 to be displaced in the lateral direction. The gussets 80 reinforce the body portion 76 of the deflector beam 19 to the suspension mounts 30a, 30c such that the body portion 76 is inhibited from deforming when the barrier 84 engages the end portions 78a, 78b. The deflector beam 19 is located such that it doesn't affect operation of the suspension system. That is, the deflector beam 19 is located such that it allows for suspension displacement of the suspension system and doesn't contact the control arm of the suspension system, for example.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:
1. A structural assembly for an electric vehicle, the structural assembly comprising:
   a vehicle frame having a pair of longitudinal rails, each rail of the pair of longitudinal rails having a first end proximate a front of the vehicle frame and a second end located further rearward of the vehicle frame than the first end;

a pair of suspension mounts configured to support a vehicle suspension system, each suspension mount of the pair of suspension mounts being secured to a respective longitudinal rail of the pair of longitudinal rails; and a deflector beam disposed between the first end and the second end of the rails and comprising a body portion and opposing end portions, the body portion extending in a transverse direction relative to a longitudinal direction of the electric vehicle and configured to support an electrical module between the pair of longitudinal rails, the deflector beam secured to the pair of suspension mounts or the vehicle frame, each end portion of the opposing end portions extending from the body portion to a respective location that is outboard of a respective suspension mount of the pair of suspension mounts.

2. The structural assembly of claim 1, wherein the deflector beam is a tubular member.

3. The structural assembly of claim 1, wherein the deflector beam is located above the longitudinal rails.

4. The structural assembly of claim 1, wherein the end portions are angled in a forward direction of the electric vehicle.

5. The structural assembly of claim 1, further comprising a pair of gussets, one gusset of the pair of gussets securing the body portion to one suspension mount of the pair of suspension mounts and the other gusset of the pair of gussets securing the body portion to the other suspension mount of the pair of suspension mounts.

6. The structural assembly of claim 5, wherein the body portion of the deflector beam comprises a first end secured to the one suspension mount and a second end secured to the other suspension mount, and wherein the first end is located outboard relative to the one gusset and the second end is located outboard relative to the other gusset.

7. The structural assembly of claim 5, wherein the body portion of the deflector beam comprises a first end secured to the one suspension mount via a first flange and a second end secured to the other suspension mount via a second flange.

8. The structural assembly of claim 1, further comprising a support brace extending in the transverse direction relative to the longitudinal direction of the electric vehicle and configured to support the electric module, the support brace is spaced apart from the deflector beam.

9. The structural assembly of claim 8, wherein the support brace is secured to the pair of suspension mounts.

10. The structural assembly of claim 8, wherein the support brace is located further toward a rear of the vehicle frame relative to the deflector beam.

11. The structural assembly of claim 1, wherein the end portions are angled away from the suspension mounts.

12. The structural assembly of claim 1, wherein the deflector beam has a square shaped cross-section.

13. A structural assembly for an electric vehicle, the structural assembly comprising:
a vehicle frame having a pair of longitudinal rails;
a pair of suspension mounts configured to support a vehicle suspension system, each suspension mount of the pair of suspension mounts being secured to a respective longitudinal rail of the pair of longitudinal rails; and
a deflector beam extending in a transverse direction relative to a longitudinal direction of the electric vehicle and configured to support an electrical module, the deflector beam secured to the pair of suspension mounts and comprising a body portion and opposing end portions, the body portion extending between the pair of longitudinal rails, each end portion of the opposing end portions extending from the body portion, outboard of the longitudinal rails at an angle that is away from the pair of suspension mounts.

14. The structural assembly of claim 13, wherein the deflector beam is a tubular member.

15. The structural assembly of claim 13, wherein the deflector beam is located above the longitudinal rails.

16. The structural assembly of claim 13, wherein the end portions are angled in a forward direction of the electric vehicle.

17. The structural assembly of claim 13, further comprising a pair of gussets, one gusset of the pair of gussets securing the body portion to one suspension mount of the pair of suspension mounts and the other gusset of the pair of gussets securing the body portion to the other suspension mount of the pair of suspension mounts.

18. The structural assembly of claim 17, wherein the angle is an obtuse angle.

19. The structural assembly of claim 17, wherein the body portion of the deflector beam comprises a first end secured to the one suspension mount via a first flange and a second end secured to the other suspension mount via a second flange.

20. An electric vehicle comprising:
a vehicle frame having a pair of longitudinal rails;
a pair of suspension mounts supporting a vehicle suspension system, each suspension mount of the pair of suspension mounts being secured to a respective longitudinal rail of the pair of longitudinal rails;
a support brace extending in a transverse direction relative to a longitudinal direction of the electric vehicle and supporting an electric module; and
a tubular shaped deflector beam extending in the transverse direction and supporting the electrical module, the deflector beam secured to the suspension mounts and spaced apart from the support brace, the deflector beam comprising a body portion and opposing end portions, the body portion extending between the pair of longitudinal rails, each end portion of the opposing end portions extending further in a lateral direction than a respective suspension mount of the suspension mounts,
wherein the end portions are angled in a forward direction relative to a horizontal axis extending in the transverse direction of the electric vehicle, and
wherein the end portions are configured to deform in a rearward direction relative to the body portion during a vehicle impact event.

* * * * *